United States Patent [19]

Guggenbuehler et al.

[11] Patent Number: 4,466,986
[45] Date of Patent: Aug. 21, 1984

[54] PROCESS FOR THE PRODUCTION OF A FLAVORING AGENT

[75] Inventors: Max Guggenbuehler, Hagenbuch; Sven Heyland, Warth, both of Switzerland

[73] Assignee: Societe D'Assistance Technique Pour Produits Nestle S.A., Lausanne, Switzerland

[21] Appl. No.: 435,075

[22] Filed: Oct. 18, 1982

Related U.S. Application Data

[63] Continuation-in-part of Ser. No. 207,662, Nov. 17, 1980, abandoned.

[30] Foreign Application Priority Data

Dec. 7, 1979 [CH] Switzerland ...................... 10851/79

[51] Int. Cl.³ ...................... A23L 1/226; A23L 1/231
[52] U.S. Cl. ...................... 426/533; 426/422
[58] Field of Search ...................... 426/533, 422

[56] References Cited

U.S. PATENT DOCUMENTS

| | | | |
|---|---|---|---|
| 2,149,306 | 3/1939 | Millar | 426/422 X |
| 3,493,385 | 2/1970 | Hack et al. | 426/424 |
| 3,952,109 | 4/1976 | Rao | 426/533 X |
| 3,966,702 | 6/1976 | Carey | 426/422 |
| 4,097,614 | 6/1978 | West | 426/422 |
| 4,194,017 | 3/1980 | Poiger et al. | 426/533 |
| 4,293,583 | 10/1981 | Farr et al. | 426/422 X |

FOREIGN PATENT DOCUMENTS 1284357  8/1972  United Kingdom ................ 426/533

*Primary Examiner*—Joseph Golian
*Attorney, Agent, or Firm*—Vogt & O'Donnell

[57] ABSTRACT

A process in which a liquid or pasty mixture containing at least one source of free amino acids and additives comprising at least one monosaccharide and, where desired, at least one sulphur-containing substance is reacted by heating. The source of free amino acids is subjected in liquid form to fractionation on a column of active carbon, some of the fractions are collected, a mixture of the fractions collected and the additives is prepared, the mixture is reacted by heating, an aromatic fraction is removed from the reaction product and/or fixed and the reaction product is dried in vacuo. The product, which has a flavor resembling in taste meat, fish or mushrooms, may be incorporated in food products such as soups, sauces, condiments and stocks.

14 Claims, No Drawings

PROCESS FOR THE PRODUCTION OF A FLAVORING AGENT

This application is a continuation-in-part of application Ser. No. 207,662, filed Nov. 17, 1980, now abandoned.

This invention relates to a process for the production of a flavouring agent.

More particularly the invention relates to a process for the production of a flavouring agent resembling in taste meat, fish or mushrooms, in which a liquid or pasty mixture containing at least one source of free amino acids and additives including at least one monosaccharide and, where desired, at least one sulphur-containing substance is reacted by heating.

The first flavouring agents, of which the taste was intended to be reminiscent of that of cooked or roasted meat and which were prepared from yeast autolysates or vegetable or animal protein hydrolysates and a reducing sugar by the Maillard reaction, suffered from serious faults both from the point of view of taste and from the point of view of keeping properties. Over the years, these products have been improved to an increasing extent by virtue of the development of increasingly more refined production processes. A significant improvement was obtained when it was found that the flavour of meat was only really imparted by the product of the Maillard reaction if the reaction was carried out in the presence of sulphur and, more particularly, in the presence of a substance containing sulphur.

Another improvement was obtained by not carrying out the reaction under reflux in a large quantity of water, which gave insipid and unstable products, and instead working in suspension or concentrated solution by which the loss of flavour during drying by evaporation in vacuo was greately reduced.

Further improvements were made by suitably selecting the starting material and the reactants and called in particular for methods of preparation of the hydrolysates involving more or less prolonged ripening stages, for example using enzymes of fresh meat.

However, flavouring agents of this type were still in need of improvement, particularly in regard to the presence of an aftertaste which betrayed the origin of the starting materials used. Thus, one known process seeks to eliminate the aftertaste of yeast which is difficult to avoid when a high proportion of the reaction mixture is formed by a commercial yeast extract. This process comprises inter alia a stage in which the yeast extract is treated by steam distillation before taking part in the reaction.

Another conventional step of this kind consists of deodourising and/or decolourising a protein hyrolysate with active carbon. This is accomplished by mixing powdered active carbon with the hydrolysate in a ratio of about 2 to 6% by weight of dry matter of the hydrolysate, treating the mixture for 15 minutes to 1 hour at 80° C. and separating the powdered carbon from the hydrolysate. This method, however, has a number of serious drawbacks. In particular, it has been found that approximately 3% of the hydrolysate is lost in such a process for every 1% of activated powdered charcoal employed. Attempts to recover this lost hydrolysate are very costly and complex for it involves many washing and filtering steps. Accordingly, in order to avoid a loss of hydrolysate, only small amounts of activated carbon are employed with the hydrolysate at any one time in such a process. Moreover, the regeneration of the exhausted powdered charcoal is also uneconomical in such a process for it requires many steps of batchwise washing and filtering in conjunction with large amounts of regenerating chemicals.

In addition to the aftertaste problem which is far from being solved, particularly in regard to a starting material such as vegetable protein hydrolysates, there is yet another problem which is also far from being solved, namely, the deterioration which the flavouring agent undergoes during the drying step.

An object of the present invention is to overcome these problems.

To this end, according to the invention a source of free amino acids is subjected in liquid form to fractionation on a column of active carbon, some of the fractions are collected, a mixture of the collected fractions and additives including at least one monosaccharide and, if desired, at least one sulphur-containing substance, is prepared, the mixture thus prepared is reacted by heating, an aromatic fraction is removed from the reaction product and/or fixed, after which the reaction product is dried in vacuo.

The process according to the invention is the outcome of a study of the starting materials most commonly used as amino acid sources in the production of flavouring agents resembling meat in their taste. It is pointed out at this juncture that, in the context of the invention, the word "taste" is used in a general sense which covers all the organoleptic sensations expressed by the terms taste and odour or flavour and aroma. These starting materials, which are the most commonly used in this branch of industry and which are particularly suitable for use in the process according to the invention, are the acid or enzymatic hydrolysates of vegetable or animal proteins and the extracts of microorganisms rich in proteins, particularly the acid hydrolysates of oilseed cakes, soya sauce and yeast autolysates. However, it is understood that other types of hydrolysates of other materials rich in proteins, such as blood, offal, sugar mill residues or cereal germs for example, and other types of extracts of other microorganisms, such as bacteria grown on substrates based on hydrocarbons for example could also be successfully used for carrying out the process according to the invention.

It has been found that the quality of the end product can be significantly improved by the combination of two effects which, although noticeable individually, are intensified to a considerable extent when combined. The first effect demonstrated and utilised in the present invention is the fractionation of the amino acid source during its purification by passage through a column filled with granular charcoal. Thus, during the passage through the column, not only are colouring substances, odoriferous substances or substances having a pronounced taste adsorbed, a shift useful from the taste point of view is also obtained in the distribution of the amino acids. Selection or subdivision of the fractions gives a clear source of amino acids which has a neutral taste and which will not mask the aroma subsequently released during the Maillard reaction.

More generally speaking, the first fractions of hydrolysate leaving the column are nearly without colour. These first fractions, having an extinction value near 0.00, contain salt and are preferably discarded. Successive fractions of hydrolysate leaving the column become darker and darker and have correspondingly higher extinction values. If it is desired to obtain a hydrolysate fraction having a range of particular extinction values, for example, in the order of 0.04 to 0.06, the fractions first leaving the column having extinction values less than that desired are not collected. The following fractions, having the desired range of extinction values, are collected and retained. Once the uppermost extinction value in the desired range is obtained, passage of the hydrolysate through the column is preferably stopped before the fractions become too dark and have a higher than desired extinction value. Due to "hold-up" in the column, a portion of the desired hydrolysate fraction may still be contained in the charcoal column itself, despite the fact that the fractions of hydrolysate leaving the column may have higher than desired extinction values. Accordingly, if desirable, the material still left in the column may be allowed to flow freely out of the column by gravity, the column is regenerated, and the hydrolysate material removed from the column is then passed through the fresh, regenerated column, either alone or in conjunction with additional hydrolysate, to obtain yet further fractionated hydrolysate having the desired extinction values.

Now, it has been found that most of the benefit of this first operation is lost as long as the aroma released during the Maillard reaction is able to escape freely during the following operation of concentration or drying in vacuo. It was this which led to the discovery that this aroma could be retained virtually in its entirety by removing and/or fixing an aromatic fraction from the reaction product before drying in vacuo.

The aromatic fraction may be removed by stripping with a gas selected from a group comprising steam, air, nitrogen, carbon dioxide and mixtures thereof. The distillate is then collected, concentrated and at least part of the concentrate returned to the dry product. The aromatic fraction may be fixed by adding to the reaction product a fixing agent selected from the group comprising starches, dextrins and vegetable fibres, particularly rice and corn starches, maltodextrin and carrot and potato fibres. By combining the effect thus obtained with the effect of fractionation in a column of active carbon, it is possible to obtain a flavouring agent where the aftertaste of the starting material gives way completely to the aroma released during the Maillard reaction.

In addition, it is known that the characteristic beef, chicken, pork, mutton or even fish note for example of this type of flavouring may be imparted by the addition to the mixture to be heated of a small quantity of fat or oil of the animal in question. The process according to the invention lends itself particularly well to this type of characterisation by the fact that the characteristic note released by the Maillard reaction in the presence of the specific fat or oil will neither be masked nor lost in the end product.

Similarly, it is known that 1-octen-3-ol is an aromatic compound characteristic of mushrooms. By applying the process according to the invention and by adding a very small quantity of this compound to the mixture or to the reaction product, it is also possible to obtain a flavouring agent which has a particularly pure and characteristic mushroom note.

In the practical application of the process according to the invention and its preferred embodiments as described above, it is possible to work under the conditions described hereinafter. For example, it is possible to take a vegetable protein hydrolysate obtained by cooking oilseed cakes with hydrochloric acid, followed by neutralisation and filtration, either on its own or in combination with a yeast autolysate obtained by the hydrolysis of yeasts with natural enzymes, followed by separation of the insoluble fractions, and to prepare a solution thereof having a dry matter content of between 40 and 50%. Fractionation on the column of active carbon may be carried out with heating at a temperature in the range from 55° to 65° C. to enable worthwhile throughputs to be obtained. The dimensions of the column and the quality of the granular active carbon may be selected depending upon the required throughput and the required effect which may be characterised by measuring the extinction coefficient of the various fractions issuing from the column. If extinction is measured at 525 nm through a 1 cm thick cell filled with a solution having a dry matter content of 45%, the results show that it is the fractions having an extinction of the order of 0.04 to 0.06 which have the most favourable composition and which give the best flavouring agents. It has been found that it is also possible to retain immediately preceding fractions (having an extinction value no less than 0.02) and/or a certain number of subsequent fractions up to an extinction of 0.15 and still be able to obtain good results. It is for this reason that it is preferred to work with a throughput corresponding to between 0.75 and 2 times the volume of the column per hour, to pass a quantity of solution corresponding to between 5 and 10 times the volume of the column through the same batch of granular active carbon and subsequently to regenerate the active carbon with heating, for example at 90° C., with a solution of a few percent of sodium hydroxide.

If it is desired to carry out the process continuously, a battery of columns may be used. Another batch may be regenerated 6 to 8 times with the solution of sodium hydroxide, after which it may be subjected to total regeneration by heating it to incandescence (850°-900° C.) in a furnace.

A mixture having a dry matter content of from 40 to 80% may be formed from the fractions collected and the additives and its pH adjusted to a value in the range from 5 to 7.

Of the additives, the monosaccharide may be added to the mixture in a quantity of from 0.5 to 10% and, if desired, the substance containing sulphur may be added in a quantity of from 0.5 to 3%. The monosaccharide, or a mixture thereof, may be particularly xylose, arabinose, fructose and/or glucose. The sulphur-containing substance may be selected from the group comprising cysteine, cystine, methionine, thiamine and their mixtures. It is also possible to add to the mixture other ingredients, flavours or flavour enhancers, such as spices or spice extracts, particularly onion extract or garlic powder, as well as nucleotides, particularly inosine monophosphate, or even glutamate or citric acid for example. Finally, the fat or oil mentioned above may be added before or during the Maillard reaction in a quantity of from 0.5 to 15%. With regard to the 1octen-3-ol also mentioned above, it may be added before or after the Maillard reaction in a quantity of approximately 0.1 to 0.6%. In this case, no sulphur-containing substance is added to ensure that the roasted taste does not mask the mushroom flavour. In order to effectively prepare the mixture, the reactants and ingredients in question may first be thoroughly mixed with part of the paste, the premix thus formed subsequently added to the rest of the paste and the whole stirred, for example, in a jacketed mixer.

The Maillard reaction may be carried out by heating the mixture to a temperature in the range from 80° to 150° C. and preferably in the range from 95° to 105° C. over a period which is shorter the higher the temperature, and which is between 1 minute and 4 hours and preferably between 30 and 60 minutes. Heating may be carried out in the mixer itself where a jacketed mixer is used or in a scraped-surface heat exchanger or even, for example, by the injection or passage of steam into or through the mass.

To isolate an aromatic fraction from the reaction product, the reaction product may thus be treated by stripping with a gas, such as steam, air, nitrogen, carbon dioxide or a mixture thereof, particularly a mixture of steam and air. This stripping treatment may be carried out countercurrently, for example, in a column filled with Raschig rings or in a tray column, using one part by weight of gas for about 1 to 2 parts by weight of product. The condensate from the stripping column may be concentrated, for example, in a rectification column operating at a high reflux ratio. It is also possible to modify the composition of the aromatic concentrate by fractional distillation. Finally, it has been found that the pH of the distillate before the rectification also has a certain influence on the final aromatic note. A particularly good note may be obtained by adjusting the pH of the distillate before rectification to a value of from about 4.5 to 5.5. A comparable result may be obtained by adjusting the pH of the pasty mixture to a value of from about 5 to 6 before the Maillard reaction.

In order to return the aromatic concentrate to the reaction product after the reaction product has been dried, the concentrate may be emulsified in oil or fat, for example, which has the effect of stabilising it, and the emulsion thus formed subsequently sprayed onto the dry product.

In order to fix an aromatic fraction in the reaction product before the reaction product is dried, a fixing agent selected from the group comprising starches, dextrins and vegetable fibres, particularly rice and corn starches, maltodextrin and carrot and potato fibres, may be added to the reaction product. One or other of these agents may be added in quantities varying from 10 to 15% by weight, based on the dry matter content of the pasty reaction product. In some cases, the fixing agent may even be added before the reaction.

It is also possible to remove a first aromatic fraction by stripping with a gas in the same way as described above and to fix a second aromatic fraction in the same way as described above.

Finally, the drying operation may be carried out under a reduced pressure of the order of 16 to 27 mbars at a temperature of the order of 60° to 70° C. and over a period of the order of 1 to 8 h so that the moisture content of the dried product does not exceed approximately 3%. To carry out this drying operation, the product is preferably spread in a thin layer over trays in an amount of from 1 to 12 kg of product per square metre in order not to prolong the drying time. The dried product may then be reduced to powder by breaking and crushing it in a suitable mill. Drying may also be carried out by spray-drying. In that case, the aromatic fraction removed and concentrated before drying may, if desired, be returned to the dried product in the same way as described above.

The dry powder-formed product may be incorporated in a whole range of food products, such as soups, sauces, condiments, stocks, etc.

The invention is illustrated by the following Examples in which the ratios, parts and percentages quoted are by weight unless otherwise indicated, as also in the foregoing general description.

EXAMPLE 1

Peanut press cakes are hydrolysed with concentrated hydrochloric acid, the resulting product is neutralised with sodium hydroxide and the insoluble fractions are separated off. A vegetable protein hydrolysate is obtained in the form of a solution.

The dry matter content of the solution is adjusted to 45%. The solution is preheated to 60° C. It is passed upwards through a jacketed column having a volume of 2.2 liters and filled with granular active carbon of the Pittsburgh type manufactured by the Chemviron Company. 10 liters of solution are passed through at a rate of 3.3 liters per hour. The solution is cooled to ambient temperature and collected in fractions of 1 liter. The first three fractions have an extinction as defined above of below 0.02. The following fractions have an extinction which increases from 0.03 for the fourth to 0.15 for the tenth. The fourth to tenth fractions are retained and combined. They are concentrated to form a paste having a dry matter content of 70%. 90% of this paste, 2% of inosine monophosphate, 2.7% of cysteine hydrochloride, 1.3% of arabinose, 0.6% of glucose and 3.4% of chicken fat are mixed and homogenised. The pH of the mixture is adjusted to 5.7, and it is preheated to 65° C. It is then heated and kept at 90° C. for 20 minutes by passage through a coil immersed in a bath of hot oil. The mixture is then heated to 110° C. and passed downwards in 2 or 3 minutes through a tray distillation column. Distillation is carried out countercurrently with steam at 110° C. using 1 part of steam for 2 parts of solution. The distillate is rectified and concentrated to one hundredth of its initial weight by distillation in two stages at a high reflux ratio in Raschig ring columns. The concentrate is then emulsified in twice its weight of fat. The reaction product is dried for 2 hours at 65° C. under a reduced pressure of the order of 16 to 27 mbars. It is then broken up and reduced to powder. The emulsified concentrate is sprayed onto this powder with vigorous stirring. A flavouring agent is obtained which combines a pleasant light colour with a particularly pure and characteristic taste of chicken.

COMPARATIVE EXAMPLE

In order to compare the process of the present invention which employs an activated charcoal column with that of the prior art in which active carbon is merely mixed with hydrolysate, the following Comparative Example, which is not in accordance with the present invention, is set forth. This Example clearly demonstrates that it is not economically possible to obtain hydrolysate having the preferred extinction values (which are obtainable by the process of the present invention) by simply mixing hydrolysate with active carbon as is done in the prior art for decolourising and/or deodourising hydrolysates.

A liquid protein hydrolysate having a dry matter content of 45% which is identical to the hydrolysate of Example 1 is prepared. It has an extinction value of 3.0. 2 parts of powdered activated carbon are added to and mixed with 100 parts of the hydrolysate and is maintained at 60° C. for 1 hour. The exhausted powdered carbon is then separated and must be discarded. It cannot economically be regenerated. The hydrolysate obtained has an extinction value of 1.0. Continued repetition of the above decolourising steps or the employment of uneconomically large amounts of carbon powder would be necessary if extinction values of between 0.02 and 0.15 were to be obtained in this manner.

EXAMPLE 2

The process is carried out in the same way as described in Example 1, except that it is carried out continuously using a battery of four fractionation columns like that described in Example 1. The same operations are carried out in each of the columns, but with a lag of 1 hour in between. Each column in turn is withdrawn for 1 hour from the fractionating operations for the purpose of regeneration. To this end, the tenth and last fraction of 1 liter issuing from the column after a cycle of 3 hours, during which 10 liters of hydrolysate solution are treated, is expelled with water, the temperature of the jacket is raised to 90° C. and a 2% sodium hydroxide solution is passed through the column at a rate of 2 liters per minute. After 9 liters have been passed through, the NaOH solution is expelled with slightly acidified water to neutralise the carbon. After 7 fractionation cycles, the adsorption capacity of the bed of active carbon has fallen to 60% of its initial value and the carbon has to be removed from the column and completely regenerated. It is then replaced by a fresh or completely regenerated batch. To obtain complete regeneration, the carbon is heated to incandescence (850°–900° C.) in a furnace. With a battery of this type used in this way, the fractionating operation is carried out continuously without any loss of time and above all very economically in regard to the active carbon because virtually all the active carbon may be recycled almost indefinitely.

EXAMPLE 3

Four tests are carried out in the same way as described in Example 1, except that on each occasion the fractionation column is filled with a different commercial-grade granular active carbon. Excellent results comparable with those of Example 1 are obtained with Chemviron's Pittsburgh CAL granular carbon for which fractions 3 to 10 have an increasing extinction rising from 0.03 for the fourth to 0.15 for the tenth.

EXAMPLE 4

Several tests are carried out in the same way as described in Example 1, except that the pH of the mixture is adjusted to 6.8 before stripping and the pH of the distillate is adjusted to different values before rectification. For pH-values of the distillate ranging from 4 to 9.6 for example, products are obtained of which the chicken taste assumes an increasingly stronger note and then gives way to a roasted taste before finally taking on a real taste of ammonia. The purest and least coarse chicken tastes are obtained with a distillate of pH 4 or 5. At pH 6.5 a slightly roasted note is obtained and beyond pH 9 the taste of ammonia dominates.

EXAMPLE 5

After neutralisation and filtration of an acid vegetable protein hydrolysates, its dry matter content is adjusted to 45%. It is fractionated by being passed upwards through a jacketed column of active carbon heated to 60° C. The column has a height of 150 cm and a diameter of 42 cm. It is filled with 150 kg of granular active carbon of the Pittsburgh type made by the Chemviron Company. The hydrolysate is passed through at a rate of 150 kg/h for 12 hours. The first three 150 kg fractions are discarded and the following nine are collected. The first of the nine fractions collected has an extinction value of 0.02. The last of the nine fractions collected has an extinction value of 0.15. They are concentrated to form a paste of which the dry matter content amounts to 70%. 2% of inosine monophosphate, 2.7% of cysteine hydrochloride, 1.3% of xylose, 0.6% of glucose and 3.4% of chicken fat are added to 90% of this paste which has a pH of 6.8. The whole is stirred under heat in a kettle, after which the Maillard reaction is carried out over a period of 15 minutes at 108° C. using 0.6 part of steam to one part of reaction product. The distillate is concentrated to 1:100 of its initial weight by rectification and the concentrate is emulsified with an equal quantity of vegetable oil. The reaction product is dried for 3 h at 65° C. under a reduced pressure of 20 mbars. The dry product is crushed and ground. The emulsified concentrate is sprayed onto the dry ground product with vigorous stirring. A flavouring agent having a clean and pure taste of chicken is obtained.

EXAMPLE 6

A fractionated hydrolysate paste having a dry matter content of 70% and a pH-value of 6.8 is prepared in the same way as described in Example 5. 2 kg of inosine monophosphate, 2.7 kg of cysteine hydrochloride, 1.3 kg of xylose, 0.6 kg of glucose and 3.4 kg of chicken fat are required for 90 kg of this paste. These components are first thoroughly mixed with 5 kg of the paste, after which this premix is added to the rest of the paste in a stirrer-equipped jacketed boiler. The whole is vigorously stirred for 10 minutes. The temperature of the mixture is raised to 104° C. with stirring. This temperature is maintained for 60 minutes. The reaction product is transferred to a water-cooled jacketed tank where maltodextrin is added in an amount of 25% by weight, based on the dry matter content of the reaction product. After vigorous stirring for 10 minutes, the maltodextrin-containing reaction product is spread on trays at a rate of 5 kg per square meter and then dried for 4 hours at 65° C. under a reduced pressure of 16 mbars. An aerated, light and odoriferous cake is obtained which is then crushed and reduced to powder. The flavouring agent thus obtained has a fine, pure and very pronounced taste of chicken.

EXAMPLE 7

Several flavouring agents resembling in taste meats other than chicken are prepared in the same way as described in Example 6. All other conditions being the same, the formulations and the reaction times are slightly varied as indicated in the following Table:

| Formulation | Taste Resembling | | | |
|---|---|---|---|---|
| | Beef | Mutton | Pork | Fish |
| Hydrolysate Paste (kg) | 90 | 93.66 | 92.16 | 71.6 |
| Inosine Monophosphate (kg) | 4 | 0.74 | 1.96 | 4.00 |
| Monosodium Glutamate (kg) | | | | 17.90 |
| Cysteine Hydrochloride (kg) | 0.75 | 0.75 | 0.49 | 0.75 |

-continued

| Formulation | Taste Resembling | | | |
|---|---|---|---|---|
| | Beef | Mutton | Pork | Fish |
| Thiamine (kg) | 0.75 | | | 0.75 |
| Xylose (kg) | | 0.38 | 0.98 | |
| Glucose (kg) | 1.50 | 0.25 | 0.25 | 1.5 |
| Beef Fat (kg) | 2.75 | | | |
| Mutton Fat (kg) | | 3.48 | | |
| Pork Fat (kg) | | | 3.43 | |
| Fish Oil (kg) | | | | 2.75 |
| Garlic Powder (kg) | | 0.74 | | 0.75 |
| Onion Extract (kg) | 0.25 | | 0.74 | 0.25 |
| Reaction Time (Mins.) | 20 | 50 | 50 | 30 |

Each of the products thus produced effectively has a pure and characteristic taste of the meat in question.

EXAMPLE 8

To operate the process described in Example 6 continuously, the reaction is carried out in a first scraped-surface heat exchanger and the subsequent cooling operation in a second exchanger of the same type.

EXAMPLE 9

A fractionated hydrolysate is prepared in the same way as described in Example 5. Its dry matter content is adjusted to 60%. 9 kg of fructose, 9 kg of valine, 2.7 kg of inosine monophosphate, 2.7 kg of citric acid and 0.2 kg of 1-octen-3-ol are added to 76 kg of this solution. The whole is vigorously stirred, the temperature of the mixture is raised to 100° C. and kept at that level for 60 minutes. Maltodextrin is then added in an amount of 25% by weight of the dry matter content of the reaction product. The mixture is dried in vacuo on plates for 4 h at 65° C. The dry product is crushed and reduced to powder. The flavouring agent thus obtained has a pure and distinct mushroom flavour.

EXAMPLE 10

The procedure is as described in Example 6, except that the reaction product is spread on trays in amounts of 1.7; 3.4; 7.2 and 12 kg/m², respectively. To obtain a really dry product, the drying time has to be extended to 4 h for 7.2 kg/m² and to 5.5 h for 12 kg/m². All the products are good.

EXAMPLE 11

The procedure is as described in Example 6, except that the amount and type of aroma fixing agent are varied. Four tests are carried out respectively with rice starch, wheat starch, carrot fibres and potato fibres, all screened on a 150μ opening sieve and using 35% of the starches and 10% of the fibres. The dried starch-containing layers are slightly hard, but otherwise the four layers finally obtained have organoleptic qualities comparable with those of the product obtained in Example 6.

We claim:

1. A process for the production of a flavouring agent resembling in taste meat, fish or mushrooms which comprises:
   subjecting a liquid protein hydrolysate having a dry matter content of between 40 and 50% by weight to fractionation on a column of granular active carbon at a throughput corresponding to between 0.75 and 2 times the volume of the column per hour;
   collecting fractions of the liquid protein hydrolysate having an extinction between 0.02 and 0.15, as measured at 525 nm in 45% solution through a thickness of 1 cm;
   preparing a mixture of the collected fractions and additives which include at least one monosaccharide and, except when producing a mushroom flavour, at least one sulphur-containing substance;
   reacting the mixture by heating;
   removing an aromatic fraction from the reacted mixture prior to concentration;
   concentrating and drying the reacted mixture; and
   returning at least part of the removed aromatic fraction to the dried product.

2. A process as claimed in claim 1, wherein the aromatic fraction is removed by stripping with a gas selected from the group comprising steam, air, nitrogen, carbon dioxide and mixtures thereof, a distillate is collected and concentrated and at least part of the concentrate is returned to the dry product.

3. A process as claimed in claim 1, wherein the source of free amino acids is a hydrolysate of vegetable or animal proteins or an extract of microorganisms rich in proteins.

4. A process as claimed in claim 1, wherein the source of free amino acids is an acid hydrolysate of an oilseed cake or a yeast autolysate.

5. A process as claimed in claim 1, wherein a fat or oil from an animal selected from the group comprising beef, chicken, pigs, sheep and fish is added to the mixture to be heated in an amount of from 0.5 to 15% by weight of the mixture.

6. A process as claimed in claim 1, wherein 1-octen-3-ol is added to the mixture or to the reaction product in an amount of from 0.1 to 0.6% of the mixture or the product.

7. A process as claimed in claim 1, wherein a mixture of the fractions collected and the additives having a dry matter content of from 45 to 80% is prepared, its pH is adjusted to 5–7 and the mixture is reacted by heating at 80°–150° C. over a period of from 1 minute to 4 hours.

8. A process as claimed in claim 1, wherein the monosaccharide is added to the mixture in an amount of from 0.5 to 10% by weight.

9. A process as claimed in claim 1, wherein a sulphur-containing substance is added to the mixture in an amount of from 0.5 to 3% by weight.

10. A process as claimed in claim 7, wherein an amount of solution of free amino acids corresponding to between 5 and 10 times the volume of the column is passed through the same batch of granular active carbon, after which the active carbon is regenerated with a dilute solution of sodium hydroxide.

11. A process as claimed in claim 10, which is carried out continuously using a battery of columns, the active carbon filling of each column being regenerated 6 to 8 times with a dilute solution of sodium hydroxide before being completely regenerated by heating to 850°–900° C.

12. A process as claimed in claim 2, wherein the distillate is concentrated by rectification, the concentrate is emulsified in an oil or a fat and the emulsion is sprayed onto the dry product.

13. A process as claimed in claim 1, wherein the reaction product is dried under reduced pressure at 60° to 70° C. over a period of 1 to 8 h so that the moisture content of the dried product does not exceed 3%.

14. A flavouring agent when produced by the process of claim 1.

* * * * *